Figure 1:
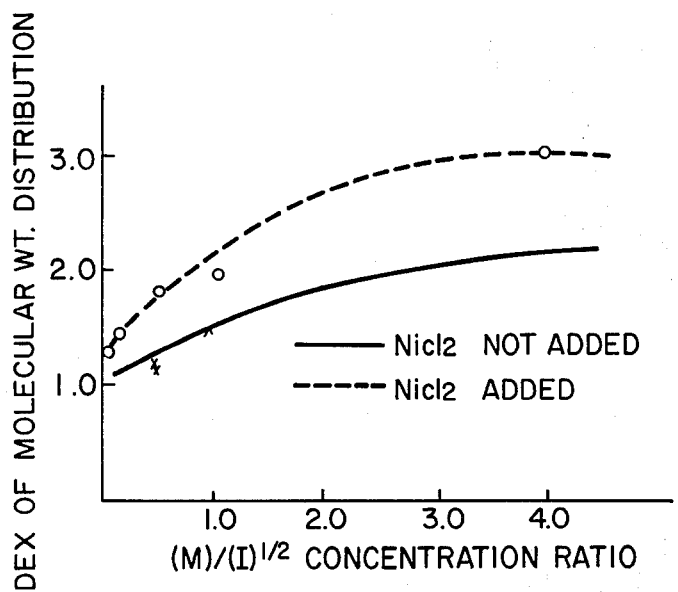

United States Patent [19]

Someya et al.

[11] 3,965,140

[45] June 22, 1976

[54] PROCESS FOR THE PREPARATION OF HYDROXYL-TERMINATED LIQUID POLYMERS

[75] Inventors: Yoshiaki Someya, Hiratsuka; Noriaki Tateno, Yokohama; Kunio Kageyama, Yokohama, all of Japan

[73] Assignee: The Yokohama Rubber Co. Ltd., Tokyo, Japan

[22] Filed: May 16, 1974

[21] Appl. No.: 470,465

[30] Foreign Application Priority Data

July 28, 1973 Japan.............................. 48-84592
July 28, 1973 Japan.............................. 48-84593

[52] U.S. Cl........................ 260/465.6; 260/618 C; 260/618 D; 260/635 H; 260/634
[51] Int. Cl.².............. C07C 121/00; C07C 31/18; C07C 29/02; C07C 31/34

[58] Field of Search............. 260/456.6, 635 H, 634, 260/618 C, 618 D

[56] References Cited
UNITED STATES PATENTS

| | | | |
|---|---|---|---|
| 2,692,892 | 10/1954 | Hillyer et al. ............... | 260/635 H X |
| 3,335,174 | 8/1967 | Norton........................ | 260/635 H X |
| 3,733,313 | 5/1973 | Johnson et al.................. | 260/634 X |
| 3,808,281 | 4/1974 | Verdol et al................. | 260/465.6 X |

*Primary Examiner*—Joseph Paul Brust
*Attorney, Agent, or Firm*—Finnegan, Henderson, Farabow & Garrett

[57] ABSTRACT

A process for the preparation of hydroxyl-terminated liquid polymers by polymerizing a conjugated diene monomer or a mixture thereof with a vinyl monomer using hydrogen peroxide as a radical initiator in the presence of a member selected from the halogen-containing compound of nickel, palladium, platinum and silver, and the nitrate and phosphate of silver.

16 Claims, 2 Drawing Figures

PROCESS FOR THE PREPARATION OF HYDROXYL-TERMINATED LIQUID POLYMERS

This invention relates to a process for preparing hydroxyl-terminated liquid polymers and more particularly it relates to a process for the preparation of hydroxyl-terminated liquid polymers which have a narrow molecular weight distribution and are useful as a raw material for polyurethane elastomers.

A process for the preparation of polymers using hydrogen peroxide as a radical initiator has long been well known. However, such a process when used for the polymerization of conjugated dienes, will give the corresponding polymer in a low yield. (Pinazzi et al., IUPAC (Helsinki) 1, 4 ('72)). Thus, hydrogen peroxide has heretofore not generally been used as a radical initiator as compared with other radical initiators such as benzoyl peroxide (BPO) and $\alpha,\alpha'$-azobisisobutyronitrile (AIBN). There have recently been demanded hydroxyl-terminated liquid polymers as a material for polyurethane elastomers which are excellent in water resistance, electrical and other various properties and may widely be used in various industrial goods such as sealing, potting, coating and damping materials. Attention has thus been drawn to polymerizing processes wherein hydrogen peroxide is used as a radical initiator, as inexpensive synthesizing means.

A polymerizing process using trihydrocarbyl orthophosphoric acid ester as a solvent (Japanese Patent Application Laying-Open 34688/72; Applicant, Atlantic Richfield Co.), and the like processes have recently been proposed. These proposed processes, however, are disadvantageous in that they use expensive chemicals in large amounts and are therefore uneconomical and the polymers obtained require to be further subjected to purifying treatments which are complicated. Therefore, processes for preparing such liquid polymers at a low cost have been sought for in the industrial field concerned. It is well known that the polymers obtained using radical initiators are characterized by their molecular weights of a wide distribution. Thus, as is seen from FIGS. 1 and 2 in the accompanying drawing, and the following formula $$\overline{Mn} = k[M]/[I]^{1/2}$$

wherein $\overline{Mn}$ is a number average molecular weight of a polymer obtained, [M] is the concentration of a monomer, [I] is the concentration of a radical initiator and k is a constant, the polymers having a molecular weight of narrow distribution will be obtained if the monomer and radical initiator are controlled to be always present in a constant mol ratio in the polymerizing reaction system (Thiokol Chem. Corp., Brit. Pat. No. 945,713 ('64)). In practice, however, such control of polymerization is difficult to effect with the result of few practical merits.

The primary object of this invention is to provide a process for preparing hydroxyl-terminated liquid polymers having a narrowly distributed and controlled molecular weight in a high yield.

This object is achieved by polymerizing a conjugated diene or copolymerizing a conjugated diene and a vinyl monomer, using hydrogen peroxide as the radical initiator, in the presence of at least one additive selected from halogen-containing compounds of nickel, palladium and platinum (of the Group VIII) and of silver (of the Group I of the Periodic Table), as well as silver nitrate and silver phosphate.

Polymers which are obtained by the polymerization of a conjugated diene as a monomer using hydrogen peroxide as the radical initiator, have a hydroxyl group at each end thereof. They may thus be reacted with a polyisocyanate to extend the polymer chain thereby producing a polyurethane elastomer, in the same manner as a polyether polyol and polyester polyol. The hydroxyl-terminated liquid polymer as one of the starting materials is required to have at least two hydroxyl groups in the molecule since these hydroxyl groups permit an effective reaction of the liquid polymer with a polyisocyanate to extend the molecular chain and increase the number of crosslinking points thereby obtaining a product having preferable rubber elasticity.

In order to obtain such terminal hydroxyl group-containing liquid polymers by a radical polymerization method, there should be used diene monomers such as butadiene-1,3, isoprene, chloroprene, pentadiene-1,3 and hexadiene-1,3, as well as vinyl monomers such as styrene, parachlorostyrene and acrylonitrile.

The terminal hydroxyl-terminated liquid polymers are obtained by polymerizing the diene monomer and, if desired, the mixture thereof with a vinyl monomer, using hydrogen peroxide as the radical initiator in the presence of at least one member selected from the group consisting of halogen-containing compounds of nickel, palladium and platinum (Group VIII) and silver (Group I), as well as silver nitrate and silver phosphate, as is indicated by the examples to be described later; and they have each, on the average, 2.1–2.7 hydroxyl groups in the molecule and are therefore suitable polymers for use as a material for polyurethanes. Said halogen-containing compounds and silver salts are hereinafter referred to as "additives." The extreme limits to the permissible range of hydroxyl groups in the molecules as taken from both the specification examples and the exemplary ranges present a combined hydroxyl group range of from 2.0–2.7.

In the preparation of polyurethane elastomers by the reaction of the liquid polymer with a diisocyanate as a chain extender and a diamine or diol as a curing agent, the uniformity of the molecular chain length (that is the chain length between the crosslinking points) of the terminal hydroxyl group-containing liquid polymers which are soft segments in contrast with hard segments where the cured material is chemically and physically crosslinked, lessens stress-concentration on the chains and is therefore considered to be conducive to enhancing the resulting elastomers in physical properties. In other words, it is desirable that the hydroxyl-terminated liquid polymer has straight-chain molecules the molecular lengths of which are as uniform as possible in order to obtain satisfactory physical properties on the resulting polyurethane since, in the polyurethane so produced, each of the molecules of the hydroxyl-terminated liquid polymer constitutes a soft segment (crosslinking unit) and the non-uniformity of the molecular lengths tends to direct stress-concentration to the shorter molecular chains thereby lessening the resulting product in tensile strength and the like. The liquid polymers obtained by polymerization using hydrogen peroxide as the radical initiator and the additive as the catalyst according to this invention, as compared with those obtained using hydrogen peroxide only, have a molecular weight of a narrow distribution. This is a surprising effect obtainable by the addition of the additive and is expected to improve the resulting polyurethane elastomer in physical properties.

Furthermore, it is appreciated with interest that the addition of the additive to a polymerizing system comprising the conjugated diene monomer or a mixture thereof with a vinyl monomer and hydrogen peroxide will give polymers having a remarkably decreased number average molecular weight in an increased yield. Thus, according to the process of this invention, it is possible to obtain liquid polymers having a narrow molecular weight distribution and a number average molecular weight of about 500 to about 10,000, preferably about 600 to about 4,000 in a high yield by the suitable selection of mol ratios between the conjugated diene monomer or a mixture thereof with a vinyl monomer and hydrogen peroxide used.

Typical of the conjugated dienes which may be used in this invention are butadiene-1,3, isoprene, chloroprene, pentadiene-1,3, hexadiene-1,3, 2,3-dimethylbutadiene-1,3 and the like, among which butadiene-1,3 and isoprene are preferable. Other monomers used herein include certain vinyl monomers such as styrene, parachlorostyrene and acrylonitrile, the polymerization-terminating reaction of which takes place in the form of a re-combination type reaction of the polymer radicals produced in the reaction system.

Hydrogen peroxide used as the radical initiator in the polymerizing system according to this invention may preferably contain at least approximately 10% by weight of water since anhydrous hydrogen peroxide is dangerous to handle. When actually used in this invention, the hydrogen peroxide may preferably be in the form of an about 30–50% aqueous solution of hydrogen peroxide but should not be limited to it.

The amount of hydrogen peroxide added to the polymerizing system according to this invention may be determined with respect to the concentration of the monomer used at the time of polymerization so as to obtain a given polymers having a number average molecular weight of 400–10,000.

The additives according to this invention include halogen-containing compounds of nickel, palladium and platinum of the Group VIII of the Periodic Table, the halogen-containing compounds being illustrated by nickel chloride, nickel bromide, nickel iodide, nickel fluoride, palladium chloride, palladium bromide, palladium iodide, platinous chloride (II), platinic chloride (IV), platinous chloride (II), platinic chloride (IV), platinous bromide (II), platinic bromide (IV), platinous iodide (II), platinic iodide (IV), tetrachloroplatinous acid (II), hexachloroplatinic acid (IV), tetrabromoplatinous acid (II), hexabromoplatinic acid (IV), tetrachloropalladous acid and hexachloropalladic acid, and further illustrated by silver chloride, silver bromide, silver iodide, silver nitrate and silver phosphate. In addition, some of the aforesaid halogen-containing metallic compounds may be in the hydrate form (for example, nickel chloride may be in the dihydrate, tetrahydrate or hexahydrate form), and such hydrates may also be used as the additive according to this invention. These additives may preferably be added to the polymerizing system in the range of molar ratios of from 1.0 × 10$^{-5}$ to 1.0 based on the conjugated diene used at the time of the polymerization. The use of the additive in excess is not economically advantageous, and the yield and molecular weight distribution of the obtained polymers are approximately constant irrespective of the concentration of the additive used. It is thus preferable that the additive be used in the possible smallest amounts in the said preferable range.

The solvents which may be used in this invention include alcohols, ketones, esters, cyclic ethers and ketoalcohols, and they are typically illustrated by methanol, ethanol, n-propanol, iso-propanol, n-butanol, sec.-butanol, tert.-butanol, n-amyl alcohol, iso-amyl alcohol, sec.-amyl alcohol, tert.-amyl alcohol, cyclohexanol, acetone, methyl ethyl ketone, methyl acetate, ethyl acetate, tetrahydrofuran, dioxane and diacetone alcohol, among which iso-propanol, n-propanol and n-butanol are preferable.

The polymerization reaction according to this invention may be carried out at 80°–200°C, preferably 100°–130°C.

The polymerization according to this invention is necessary to effect in an atmosphere from which the oxygen has thoroughly been excluded in order to prevent the resulting polymer from being degraded due to oxidation.

The hydroxyl group concentration of the polymer obtained is determined by the acetylation method using acetic anhydride, and the number of hydroxyl groups contained in each molecule of the polymer is calculated from the hydroxyl group concentration so obtained and the number average molecular weight obtained by Vapor Pressure Osmometry (hereinafter referred to as "VPO"). The hydroxyl groups of the liquid polymer according to this invention are usually primary ones located at the terminal allyl positions on the hydrocarbon main chain of the polymer. Even if a few of the hydroxyl groups have been internally substituted along the main chain of the polymer, a greater part of them are considered to be located at the allyl positions.

According to this invention there are usually obtained liquid polymers having, on the average, at least two hydroxyl groups per polymer molecule, and they are therefore fully suitable as a material for polyurethane elastomer.

Figure 2:
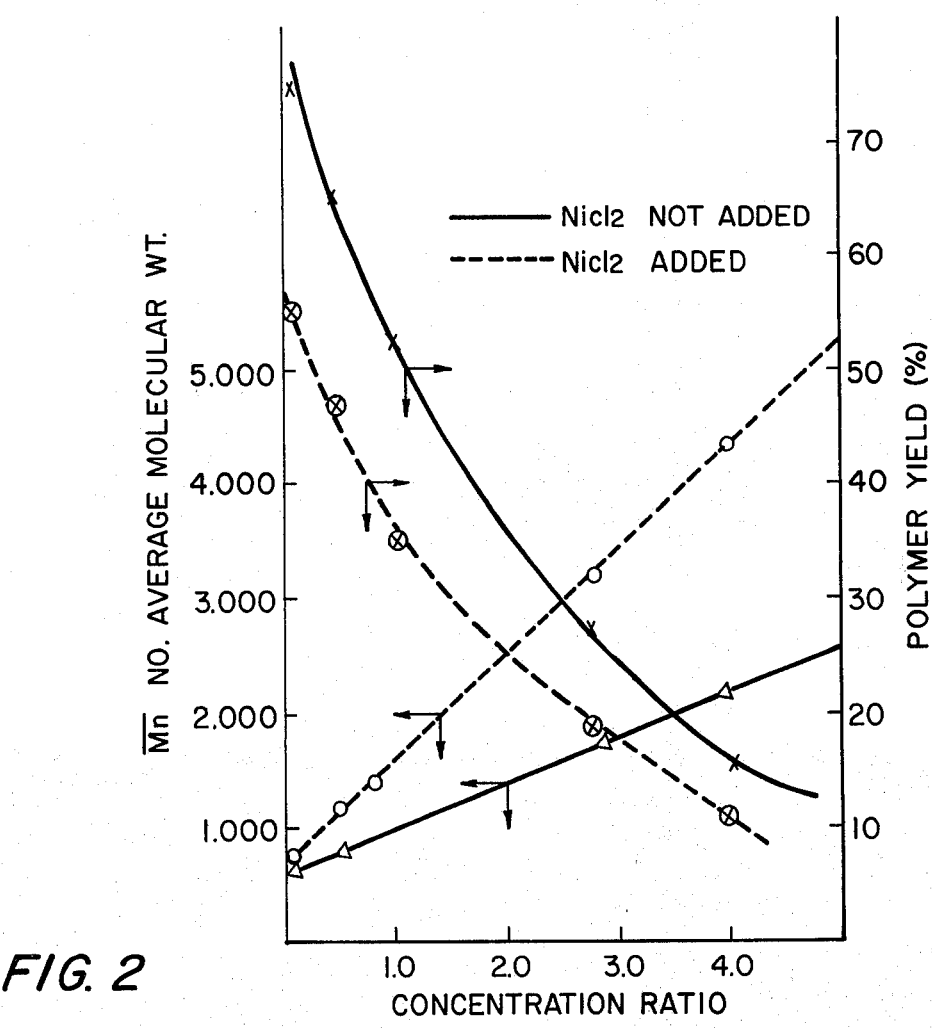

In the accompanying drawings,

FIG. 1 shows curves indicating relationships between the concentration ratio of monomer to hydrogen peroxide used and the index of molecular weight distribution, the dotted curve being for addition of nickel chloride and the solid curve for non-addition thereof, respectively; and FIG. 2 shows curves indicating a change in number average molecular weight and polymer yield with the concentration ratio of monomer to hydrogen peroxide used, the dotted curves being for addition of nickel chloride and the solid curves for non-addition thereof.

The molecular weight distribution is determined by Gel Permeation Chromatography (hereinafter referred to as "GPC"). From the distribution curves thus obtained, there are calculated the ratios of $\overline{M}w/\overline{M}n$ ($\overline{M}w$ being weight average molecular weight and $\overline{M}n$ number average molecular weight) which are indices representing the degree of molecular weight distribution. Referring to said ratios, the degrees of molecular weight distribution will be discussed below. The molecular weight distribution of the polymers according to this invention is represented by the ratios of $\overline{M}w/\overline{M}n$ ranging from 1.4 to 1.8 and that of conventional polymers obtained without the use of the additive according to this invention is indicated by the ratios of $\overline{M}w/\overline{M}n$ ranging from 1.9 to 2.4. As is clear from the above, the former distribution as compared with the latter is remarkably narrow thereby proving that the polymers according to this invention can be said to be ones wherein the lengths of the molecules are uniform, that is, the molecular weights are distributed in an approximately simple fashion.

The extreme limits to the molecular weight distribution index ($\overline{M}w/\overline{M}n$) of the polymers according to this invention as taken from the collective examples, range from 1.4–2.5.

The hydroxyl-terminated liquid polymers so obtained were analyzed for their microstructure by infra-red spectroscopic analysis. The isoprene polymer and butathe concentraton, to permit the production of polymers having a decreased number average molecular weight and a narrow distribution of molecular weight, in a high yield.

As shown in Reference 2, if there is attempted to obtain a polymer which is approximately equal in properties to the polymer having the low number average molecular weight obtained in Example 1, the polymer will be produced in a decreased yield. In this respect the process of this invention is found to be very advantageous.

Table 1

| | Isoprene (Parts) | Hydrogen peroxide (Parts) | Nickel chloride hexahydrate (Parts) | Nickel chloride hexahydrate (Molar ratio to monomer) | Number average molecular weight $\overline{M}n$ | Distribution of molecular weight $\overline{M}w/\overline{M}n$ | Concentration of hydroxyl group meq/g | No. of hydroxyl groups in molecule | Yield (%) |
|---|---|---|---|---|---|---|---|---|---|
| Example 1 | 84 | 16 | 0.05 | 0.0006 | 1140 | 1.5 | 1.88 | 2.1 | 41 |
| Example 2 | 84 | 16 | 0.30 | 0.0036 | 1020 | 1.5 | 1.94 | 2.0 | 40 |
| Example 3 | 84 | 16 | 0.50 | 0.0060 | 1070 | 1.5 | 2.05 | 2.2 | 41 |
| Reference 1 | 84 | 16 | — | — | 3000 | 1.9 | 0.75 | 2.3 | 28 |
| Reference 2 | 84 | 33 | — | — | 1100 | 2.0 | 1.73 | 1.9 | 19 | diene polymer were analyzed for their microstructures by the use of Binder's method (Anal. Chem. 29, 503 (1957)) and Morero's method (Chem. e Ind., 41, 758 (1959)), respectively. As is seen from the examples to be described later, the microstructures of the polymers according to this invention are almost the same as those of the conventional polymers obtained without the use of the additive according to this invention; for example, in butadiene polymers the cis-1,4, trans-1,4 and 1,2 addition structures are usually present in amounts of approximately 20, 60 and 20%, respectively, and in isoprene polymers the cis-1,4, trans-1,4, 1,2 and 3,4 addition structures are usually contained in amounts of approximately 30, 40, 15 and 15%, respectively.

This invention will be further explained by reference to the following examples to which this invention is not limited and wherein all parts are by weight unless otherwise specified.

EXAMPLES 1–3

A dry pressure bottle was charged with 84 parts of isoprene, 16 parts of hydrogen peroxide, 0.05 or 0.30 part (molar ratio of 0.0006 or 0.0036 based on the monomer used) of nickel chloride hexahydrate and 90 parts of isopropanol, and the bottle so charged was thoroughly freed from oxygen, sealed and then placed in a constant temperature bath at 110°C to polymerize the charged materials for two hours. The reaction mixture was filtered with 50 parts of cyclohexane to collect a filtrate which was then dried at 40°C under a reduced pressure for 72 hours thereby obtaining a colorless transparent liquid polymer in a yield of 41%. As shown in Table 1, there were thus obtained polymers having a number average molecular weight of 1,140 (VPO) and a distribution ratio ($\overline{M}w/\overline{M}n$) of 1.5 as determined by GPC, which ratio showed a very narrow distribution of molecular weight for these polymers obtained by radical polymerization. The polymers so obtained had a hydroxyl group concentration of 1.91 meq/g which means that they contained 2.1 hydroxyl groups per molecule. The variation of concentration of nickel chloride used, as compared with the non-use of nickel chloride in References 1–2, was found, irrespective of

EXAMPLE 4

To a dry pressure bottle were added 80 parts of isoprene, 15 parts of hydrogen peroxide, 0.05 part of palladium chloride and 90 parts of isopropanol to form a mixture which was then polymerized under the same conditions as used in Example 1. The reaction mixture so produced was separated to obtain a polymer which was purified thereby obtaining a liquid polymer in a yield of 45%. The liquid polymer thus obtained had a number average molecular weight of 1600 (VPO), a molecular weight distribution ($\overline{M}w/\overline{M}n$) of 1.8 (GPC), a hydroxyl group concentration of 1.88 meq/g, 2.3 hydroxyl groups per molecule and approximately the same microstructure as the polymer obtained in Example 1.

EXAMPLE 5

A dry pressure bottle was charged with 85 parts of isoprene, 15 parts of hydrogen peroxide, 0.07 part of hexachloroplatinic acid and 90 parts of isopropanol to form a mixture which was polymerized under the same condition as used in Example 1, separated and purified thereby obtaining a liquid polymer in a yield of 53%. The polymer so obtained had a number average molecular weight of 1700 (VPO), a molecular weight distribution ($\overline{M}w/\overline{M}n$) of 2.3, a hydroxyl group concentration of 1.53 meq/g, 2.7 hydroxyl groups per molecule and approximately the same microstructure as the polymer obtained in Example 1.

EXAMPLE 6

A dry pressure bottle was charged with 80 parts of butadiene, 16 parts of hydrogen peroxide, 0.05 part of nickel chloride hexahydrate and 90 parts of isopropanol to form a mixture which was polymerized under the same condition as used in Example 1, separated and purified thereby to obtain a liquid polymer in a yield of 46%. The polymer thus obtained had a number average molecular weight of 1500 (VPO), a molecular weight distribution ($\overline{M}w/\overline{M}n$) of 1.4 (GPC), a hydroxyl group concentration of 1.47 meq/g, 2.2 hydroxyl groups per molecule and a structure wherein the trans-1,4, cis-1,4 and 1,2 addition structures were present in amounts of 60, 20 and 20%, respectively.

EXAMPLE 7

To a dry pressure bottle were added 100 parts of isoprene, 20 parts of hydrogen peroxide, 0.01 part of nickel bromide and 100 parts of isopropanol to form a mixture which was polymerized under the same conditions as used in Example 1, separated and purified thereby to obtain a liquid polymer in a yield of 48%. The polymer thus obtained had a number average molecular weight of 1200 (VPO), a molecular weight distribution ($\overline{Mw}/\overline{Mn}$) of 1.6, a hydroxyl group concentration of 1.82 meq/g, 2.2 hydroxyl groups per molecule and approximately the same microstructure as the polymer obtained in Example 1.

EXAMPLE 8

To a dry pressure bottle were added 100 parts of isoprene, 25 parts of hydrogen peroxide, 0.06 parts of palladium iodide and 100 parts of isopropanol to form a mixture which was polymerized under the same condition as used in Example 1, separated and then purified thereby obtaining a liquid polymer in a yield of 51%. The thus-obtained polymer had a number average molecular weight of 1050 (VPO), a molecular weight distribution ($\overline{Mw}/\overline{Mn}$) of 1.5 (GPC), a hydroxyl group concentation of 2.18 meq/g, 2.3 hydroxyl groups per molecule and approximately the same microstructure as the polymer obtained in Example 1.

EXAMPLE 9

To a dry pressure bottle were added 100 parts of isoprene, 2 parts of hydrogen peroxide, 0.06 part of palladium chloride and 100 parts of isopropanol to form a mixture which was polymerized under the same conditions as used in Example 1, separated and purified thereby obtaining a liquid polymer in a yield of 53%. This polymer as compared with a polymer obtained without the use of the additive in Reference 3, was a hydroxyl-terminated liquid polymer which had a narrowly distributed molecular weight and a decreased number average molcular weight.

Table 2

|  | Example 9 | Reference 3 |
|---|---|---|
| Isoprene (Parts) | 100 | 100 |
| Hydrogen peroxide (Parts) | 2 | 2 |
| Palladium chloride (Parts) | 0.06 | — |
| Palladium chloride (Molar ratio to monomer) | 0.0003 | — |
| Number average molecular weight $\overline{Mn}$ | 3050 | 6000 |

Table 2-continued

|  | Example 9 | Reference 3 |
|---|---|---|
| Distribution of molecular weight $\overline{Mw}/\overline{Mn}$ | 1.4 | 2.1 |
| Hydroxyl group concentration (meq/g) | 0.75 | 0.35 |
| No. of hydroxyl groups per molecule of polymer | 2.3 | 2.1 |
| Yield (%) | 53 | 30 |

EXAMPLE 10

A dry pressure bottle was charged with 11 parts of isoprene, 16 parts of styrene, 3.3 parts of $H_2O_2$, 0.2 part of $PdCl_2$ and 10 parts of isopropanol to form a mixture which was then polymerized under the same condition as used in Example 1 to obtain a liquid copolymer in a high yield of 99%, the polymer having a number average molecular weight ($\overline{Mn}$) of 1220, a molecular weight distribution ($\overline{Mw}/\overline{Mn}$) of 1.5 and a hydroxyl group concentration of 1.92 meq/g. In contrast with this, the aforesaid procedure was followed with the exception that $PdCl_2$ was not used, thereby obtaining in a yield of only 56% a liquid copolymer having a $\overline{Mn}$ of 1680, a $\overline{Mw}/\overline{Mn}$ of 2.2 and a hydroxyl group concentration of 1.41 meq/g.

EXAMPLE 11

A dry pressure bottle was charged with 34 parts of isoprene, 6.6 parts of a 30 wt.% aqueous solution of hydrogen peroxide, 0.2 part of silver chloride and 24 parts of isopropanol, thereafter thoroughly freed from the oxygen and sealed. The flask so charged and sealed was then placed in a thermostatic vessel at 110°C to polymerize the materials charged therein for two hours. The reaction mixture so obtained was decanted with 50 parts of cyclohexane to separate the thus-obtained polymer from the silver chloride. The polymer was dried at 40°C for 72 hours under a reduced pressure and tested for the various properties as shown in Table 3. The same procedure was repeated except that the amount of silver chloride used was varied in each case. From this Table it is seen that said polymer had approximately the same average molecular weight as that obtained without the use of the additive (silver chloride) in Reference 4 and could be obtained in a remarkably high yield and that the use of a silver salt other than the silver salt according to this invention did not result in the production of a polymer in a good yield as shown in Reference 5.

Table 3

|  | Additive (g) | | Yield | Number average molecular weight $\overline{Mn}$ | $\overline{Mw}/\overline{Mn}$ | Hydroxyl group concentration (meq/g) | No. of hydroxyl group per molecule of polymer |
|---|---|---|---|---|---|---|---|
|  | AgCl | Ag$_2$S | (%) | | | | |
| Example 11-a | 0.5 | — | 65 | 2500 | 2.0 | 0.92 | 2.3 |
| Example 11-b | 0.2 | — | 64 | 2220 | 2.0 | 1.32 | 2.0 |
| Example 11-c | 0.1 | — | 65 | 2420 | 2.0 | 0.95 | 2.3 |
| Example 11-d | 0.01 | — | 60 | 2300 | 2.0 | 0.845 | 2.2 |
| Refernce 4 | — | — | 30 | 2500 | 1.9 | 0.77 | 1.9 |
| Reference 5 | — | 0.2 | 26 | 5400 | 2.5 | 0.464 | 2.5 |

The microstructure of the polymers according to this invention was such that the trans-1,4, cis-1,4, 1,2 and 3,4 addition structures were contained in the amounts of approximately 40%, 30%, 15% and 15% in the polymer. Said microstructure was thus found to be approximately the same as that of the polymer obtained without the use of the additive according to this invention.

EXAMPLE 12

A dry pressure bottle was charged with 34 parts of isoprene, 7.0 parts of a 30 wt.% aqueous solution of hydrogen peroxide, 0.2 part of silver bromide and 24 parts of isopropanol to form a mixture which was polymerized under the same condition as used in Example 11, separated and purified thereby obtaining a liquid polymer in a yield of 68%. The thus-obtained polymer had a number average molecular weight of 2020, a molecular weight distribution ($\overline{M}w/\overline{M}n$) of 2.2, a hydroxyl group concentration of 1.14 meq/g, 2.3 hydroxyl groups per molecule of the polymer and approximately the same microstructure as the polymers obtained in Example 11.

EXAMPLE 13

A dry pressure bottle was charged with 34 parts of isoprene, 6.6 parts of a 30 wt.% aqueous solution of hydrogen peroxide, 0.2 part of silver nitrate and 24 parts of isopropanol to form a mixture which was polymerized under the same conditions as used in Example 11, separated and purified thereby obtaining a liquid polymer in a yield of 62%. The polymer so obtained had a number average molecular weight of 2020, a molecular weight distribution ($\overline{M}w/\overline{M}n$) of 2.1, a hydroxyl group concentration of 1.01 meq/g, 2.1 hydroxyl groups per molecule of the polymer and a microstructure which was approximately the same as that of the polymers obtained in Example 11.

EXAMPLE 14

To a dry pressure bottle were added 34 parts of isoprene, 7.7 parts of a 30 wt.% aqueous solution of hydrogen peroxide, 0.2 part of silver phosphate and 24 parts of isopropanol, and the resulting mixture was polymerized under the same conditions as used in Example 11 to obtain in a yield of 64% a liquid polymer having a number average molecular weight of 2000, a hydroxyl group concentration of 1.05 meq/g, 2.1 hydroxyl groups per molecule of the polymer, a molecular weight distribution ($\overline{M}w/\overline{M}n$) of 2.5 and approximately the same microstructure as the polymers obtained in Example 11.

EXAMPLE 15

To a dry pressure bottle were added 10 parts of isoprene, 17 parts of styrene, 6.6 parts of a 30 wt.% aqueous solution of hydrogen peroxide, 0.2 part of silver chloride and 24 parts of isopropanol, and the whole mass was polymerized under the same conditions as used in Example 11, separated and purified to obtain in a yield of 85% a liquid polymer having a number average molecular weight of 7800, a hydroxyl group concentration of 0.269 meq/g and 2.1 hydroxyl groups per molecule of the polymer. On the other hand, a liquid polymer obtained (in a yield of 62%) in the same manner as above except that silver chloride was not used, had a number average molecular weight of 8000, a hydroxyl group concentration of 0.25 meq/g and 2.0 hydroxyl groups per molecule of the polymer.

EXAMPLE 16

A dry pressure bottle was charged with 20 parts of butadiene, 6 parts of a 30 wt.% aqueous solution of hydrogen peroxide, 0.2 part of silver nitrate and 30 parts of isopropanol to form a mixture which was polymerized under the same conditions as used in Example 11, separated and purified thereby to obtain a liquid polymer in a yield of 70%. The polymer so obtained had a number average molecular weight of 2600, a molecular weight distribution ($\overline{M}w/\overline{M}n$) of 2.0, a hydroxyl group concentration of 0.846 meq/g, 2.2 hydroxyl groups per molecule of the polymer and a microstructure such that the trans-1,4, cis-1,4, and 1,2 addition structures are contained in the amounts of 60%, 20% and 20%, respectively.

EXAMPLE 17

One hundred parts of the hydroxyl-terminated polymer as obtained in Example 11 were mixed with 5 parts of bis(hydroxypropyl)aniline to form a mixture which was incorporated with 26.7 parts of a mixture of 2,4-tolylene diisocyanate and 2,6-tolylene diisocyanate in the ratio of 80 : 20. The Whole mass was dried and then heated to 80°–90°C for 3 hours in an atmosphere of nitrogen to obtain a prepolymer containing NCO in the amount of 6.0%. One hundred parts of the thus-obtained prepolymer were heated to 80°C, incorporated with 19.3 parts of methylene-bis(2-chloroaniline) in the molten state at 120°C, degassed in vacuo and molded into sheets which were kept at 100°C for 3 hours and then post-cured at 100°C for one day thereby obtaining a light-yellow whitish-turbid elastomer having the following properties:

Shore A hardness, 96; Tensile strength, 245 Kg/cm$^2$; 100% modulus, 105 Kg/cm$^2$; Elongation at break, 228%; Tear strength, 87 Kg/cm; and Lupke Rebound, 46%.

As mentioned above, there can be obtained, in a high yield, hydroxyl-terminated liquid polymers which are useful as a material for polyurethane elastomers.

What is claimed is:

1. A process for the preparation of hydroxyl terminated liquid polymers wherein said polymers have a number average molecular weight of about 500 to about 10,000 and 2.0–2.7 terminal hydroxy groups per molecule located at the allyl position thereof, and wherein said polymers are obtained by polymerizing a conjugated diene monomer, wherein said diene monomer has 4-6 carbon atoms with conjugated double bonds, said conjugated diene monomer being the sole reactive organic component in a closed, oxygen-free cell at a constant temperature ranging from about 80°C to about 200°C using an aqueous solution of hydrogen peroxide as a radical initiator in the presence of a metal halide selected from the group consisting of nickel, palladium and platinum wherein said metal halide is present in the amount of a molar ratio to the monomer used of from $1.0 \times 10^{-5}$ to 1.0, and wherein said polymers are obtained from a single phase reaction system with isopropanol as the reaction medium.

2. A process according to claim 1, wherein said conjugated diene monomer is butadiene.

3. A process according to claim 1, wherein said conjugated diene monomer is isoprene.

4. A process according to claim 1, wherein said polymers are further characterized as having a narrow molecular weight distribution index ($\overline{M}w/\overline{M}n$) of from 1.4 to 2.5.

5. A process for the preparation of hydroxyl terminated liquid polymers, wherein said polymers have a number average molecular weight of from about 500 to about 10,000, and 2.0–2.7 terminal hydroxy groups per molecule located at the allyl position thereof and wherein said polymers are obtained by polymerizing a conjugated diene monomer, wherein said diene monomer has 4–6 carbon atoms with conjugated double bonds, said conjugated diene monomer being the sole reactive organic component, in a closed oxygen-free cell at a constant temperature ranging from about 80°C to about 200°C using an aqueous solution of hydrogen peroxide as a radical initiator in the presence of a silver salt selected from the group consisting of silver nitrate, silver phosphate, and silver halide, wherein said silver compound is present in the amount of a molar ratio to the monomer used of from $1.0 \times 10^{-5}$ to 1.0, and wherein said polymers are obtained from a single phase reaction system with isopropanol as the reaction medium.

6. A process according to claim 5, wherein said conjugated diene monomer is butadiene.

7. A process according to claim 5, wherein said conjugated diene monomer is isoprene.

8. A process according to claim 5, wherein said polymers are further characterized as having a narrow molecular weight distribution index ($\overline{M}w/\overline{M}n$) of from 1.4 to 2.5.

9. A process for the preparation of hydroxyl terminated liquid polymers, wherein said polymers have a number average molecular weight of from about 500 to about 10,000, and 2.0–2.7 terminal hydroxy groups per molecule located at the allyl position thereof and wherein said polymers are obtained by copolymerizing a conjugated diene monomer, wherein said diene monomer has 4–6 carbon atoms with conjugated double bonds, in a closed oxygen-free cell at a constant temperature ranging from about 80°C to about 200°C together with a vinyl monomer selected from the group consisting of parachlorostyrene, acrylonitrile and styrene, using an aqueous solution of hydrogen peroxide as a radical initiator in the presence of a metal halide selected from the group consisting of nickel, paladium, and platinum wherein said metal halide is present in the amount of a molar ratio to the monomer used of from $1.0 \times 10^{-5}$ to 1.0, wherein said polymers are obtained from a single phase reaction system with isopropanol as the reaction medium, and wherein the aforesaid conjugated diene monomer and the aforesaid vinyl monomer constitute the sole organic reactive components.

10. A process according to claim 9, wherein the conjugated diene monomer is butadiene.

11. A process according to claim 9, wherein the conjugated diene monomer is isoprene.

12. A process according to claim 9, wherein said polymers are further characterized as having a narrow molecular weight distribution index ($\overline{M}w/\overline{M}n$) of from 1.4–2.5.

13. A process for the preparation of hydroxyl terminated liquid polymers, wherein said polymers have a number average molecular weight of from about 500 to about 10,000 and 2.0–2.7 terminal hydroxy groups per molecule located at the allyl positions thereof and wherein said polymers are obtained by copolymerizing a conjugated diene monomer, wherein said diene monomer has 4–6 carbon atoms with conjugated double bonds in a closed oxygen-free cell at a constant temperature ranging from about 80°C to about 200°C, together with a vinyl monomer selected from the group consisting of parachlorostyrene, acrylonitrile and styrene, using an aqueous solution of hydrogen peroxide as a radical initiator in the presence of a silver salt selected from the group consisting of silver nitrate, silver phosphate and silver halide wherein said silver compound is present in the amount of a molar ratio to the monomer used of from $1.0 \times 10^{-5}$ to 1.0, wherein said polymers are obtained from a single phase reaction system with isopropanol as the reaction medium and wherein the aforesaid diene monomer and the aforesaid vinyl monomer constitute the sole reactive organic components.

14. A process according to claim 13, wherein the conjugated diene monomer is butadiene.

15. A process according to claim 13, wherein the conjugated diene monomer is isoprene.

16. A process according to claim 13, wherein said polymers are further characterized as having a narrow molecular weight distribution index ($\overline{M}w/\overline{M}n$) of from 1.4–2.5.

* * * * *

UNITED STATES PATENT AND TRADEMARK OFFICE
CERTIFICATE OF CORRECTION

PATENT NO. : 3,965,140
DATED : June 22, 1976
INVENTOR(S) : Yoshiaki Someya et al It is certified that error appears in the above-identified patent and that said Letters Patent are hereby corrected as shown below:

Claim 13, column 12, line 31, before "diene" insert --conjugated--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*